ated May 11, 1909.

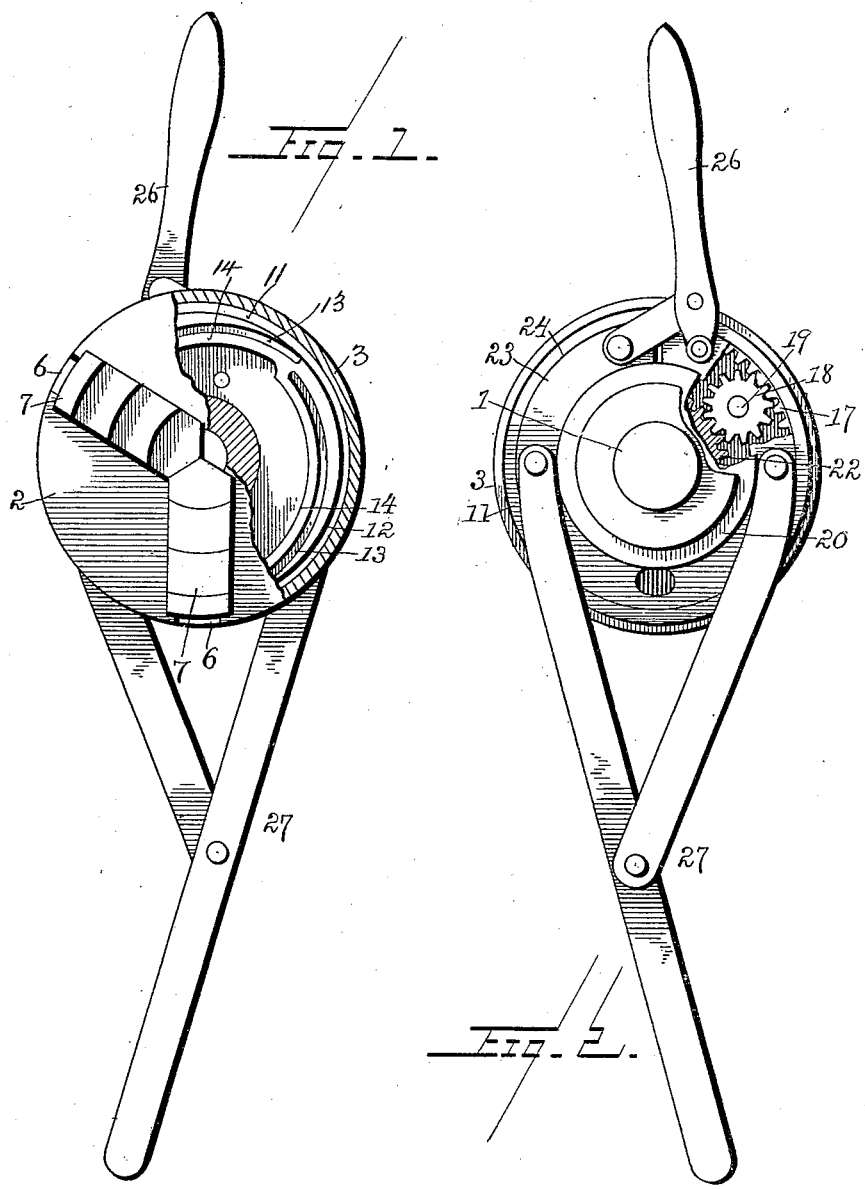

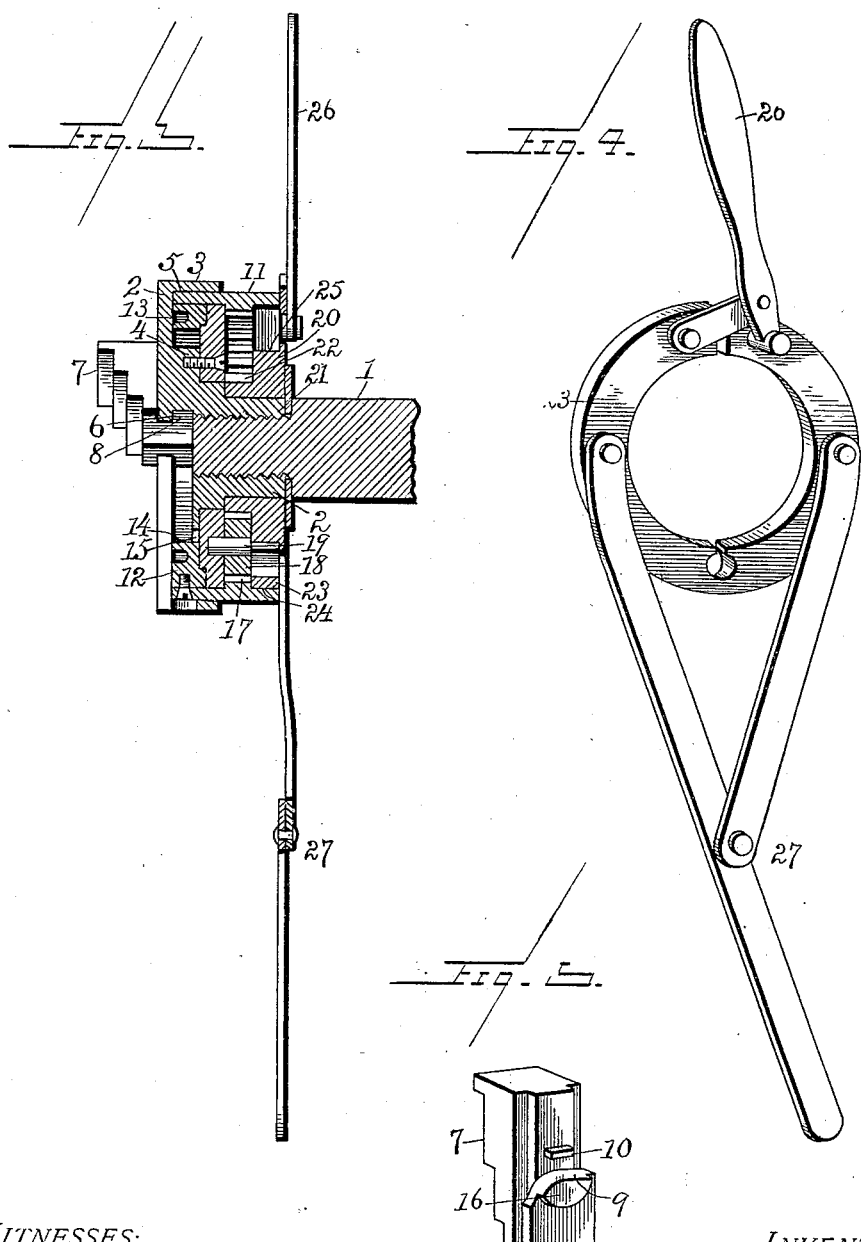

UNITED STATES PATENT OFFICE.

HARRY P. TOWNSEND, OF NEW BRITAIN, CONNECTICUT, ASSIGNOR TO THE HARTFORD MACHINE SCREW COMPANY, OF HARTFORD, CONNECTICUT, A CORPORATION OF CONNECTICUT.

CHUCK.

No. 921,568.  Specification of Letters Patent.  Patented May 11, 1909.

Application filed October 14, 1903. Serial No. 177,016.

*To all whom it may concern:*

Be it known that I, HARRY P. TOWNSEND, a citizen of the United States, and a resident of New Britain, in the county of Hartford and State of Connecticut, have invented certain new and useful Improvements in Chucks, of which the following is a specification.

My invention relates more especially to the class of movable devices employed for holding work to be operated upon by a stationary tool, or to devices in which the tool may be carried in the movable part while the work is held, and the object of my invention is to provide a neat, compact and durable tool of this class in which the work, or tools of different sizes may be readily inserted and clamped in position while the holder is moving or rotating. A device by means of which these objects may be attained is illustrated in the accompanying drawings in which:

Figure 1 is a face or end view of a chuck embodying my improvement with parts broken away to show construction. Fig. 2 is a rear view of the same with parts broken away to show construction. Fig. 3 is a view in longitudinal section through the device. Fig. 4 is a perspective view of the friction ring. Fig. 5 is a perspective view of one of the jaws showing a scroll stud and stop.

In the accompanying drawings the numeral 1 indicates a spindle, that, in the form of device herein illustrated and described is removably secured to the chuck body 2, the reduced end of the spindle fitting within a screw threaded opening in the chuck body. The spindle 1 may be a separate piece adapted to be secured in the head of a lathe, or it may form the spindle of the lathe head and it is also obvious that the spindle 1 and body 2 may be formed of a single piece if desired.

The chuck body has a flange 3 and a central boss 4 forming an annular chamber 5. This chuck body is also provided with radial grooves 6 that are undercut or wider at the deeper portions for the reception of the flanges 8 of the chuck jaws 7. Any suitable number of chuck jaws 7 are employed, as shown herein these are arranged substantially 120 degrees apart. Each jaw is provided on its working face with suitable holding means as a series of shoulders common to this class of devices. The flanges 8 are located at the rear of the jaws on projections forming shoulders 9. A scroll stud 10 also projects from the rear of each jaw in a position near the shoulder 9.

A scroll ring 11 is located in the chuck body 2, this scroll ring having a scroll flange 12 located in the annular chamber 5 in the body. This flange is also provided with scrolls 13 eccentrically arranged with respect to the axis of the ring. This scroll flange is also provided with scroll shoulders 14 each shoulder being mounted appurtenant to and concentric with the scroll. The scroll stud 10 from each of the chuck jaws 7 engages one of the scrolls and the shoulder 9 on each jaw engages a scroll shoulder 14. The scrolls 13 operate to open the jaws and the scroll in connection with the scroll shoulders operate to close the jaws. This construction is found to be of material advantage for the reason that the strain when the jaws close upon the work is resisted or backed up by the scroll shoulder as well as the groove forming the scroll so that the parts may successfully withstand this strain. The central boss 4 is also provided with recesses 15 into which stops 16 on the chuck jaws engage for the purpose of limiting the movement of the jaws. The scroll ring is provided on its inner surface with an internal gear 17. Pinions 18 are also mounted on studs 19 secured to the chuck body, these pinions meshing with the internal gear 17. An opening ring 20 is rotatably mounted on the spindle 1 projecting from the center of the chuck body and this opening ring has a gear 22 meshing with the pinions 18. A friction ring 23 is located within the scroll ring and in a position to grasp a friction surface 24 on the scroll ring or a friction surface 25 on the opening ring by expansion or contraction. This friction ring 23, constitutes a brake for retarding the motion of either the scroll ring or the opening ring and thus controls the operation of said rings for opening and closing the chuck jaws. This friction ring or brake is split and is provided with means, as a lever handle 26 for contracting or expanding the ring against either the opening ring or scroll ring. A stop 27 is employed for holding the friction ring against rotation.

In the operation of the device the spindle 1 and the chuck body being under rotation and the chuck jaws being closed upon a piece of work, by throwing the lever handle 26 in one direction, the friction ring 23 being contracted to grasp the opening ring 20, the pinions 18 are caused to rotate on their axes. The ring 20 being held against rotation, the action of the pinions rotates the scroll ring 11 at a faster rate than that at which the chuck body is moving and the grooves in the ring acting upon the scroll studs on the jaws cause the latter to be opened. If the lever handle 26 is moved in the opposite direction the scroll ring is held against rotation and the chuck body continuing to revolve closes the chuck jaws. In this closing movement as the chuck jaws come together and grasp a piece of work the extent of grip will be determined by the amount of force applied to the lever handle 26. The strain as the chuck jaws grasp the work will be successfully resisted by the shoulders on the chuck jaws resting against the scroll shoulders 14 on the ring.

It is obvious that the construction herein described may be modified or changed to a considerable extent without departing from the invention and I do not desire or intend to limit myself to the exact construction herein shown and described.

It will be observed that I provide a self contained structure all the working parts of which are arranged within and wholly inclosed by the casing of the chuck body. It is absolutely essential in devices of this class that the several parts be thoroughly protected from chips and liability to injury. In the device above described I provide a self contained tool which may readily be applied to or removed from a spindle and used in the place of any ordinary chuck or like device, without necessitating any change of parts in the machine, and with the attendant advantages enumerated in connection with my device. In fact, I provide a self-contained and bodily removable chuck with all working parts and even the controlling devices coalesced into a single structure.

What I claim as my invention and desire to secure by Letters Patent is:—

1. A spindle, a complete chuck including a main body part located at the end of the spindle, chuck jaws located in the chuck body, a casing with operative connections for moving the jaws in one direction, and operatively connected with relatively movable means for moving the jaws in the opposite direction, and a friction brake arranged to be contracted and expanded to clutch said means when contracted and to clutch the casing when expanded, whereby the chuck jaws are moved radially.

2. A chuck comprising a chuck body and means for securing it to a spindle, a relatively rotatable casing coöperating with said chuck and inclosing the parts, means appurtenant to the casing engaging the chuck jaws for moving them, and a friction brake mounted within the casing and adapted to engage said casing thereby actuating the chuck jaws.

3. A chuck comprising a chuck body and means for securing it to a spindle, chuck jaws mounted in the chuck body, a pair of concentrically arranged rings operatively interconnected for relative rotatable movements, connections between one of said rings and the chuck jaws adapted to move said jaws radially upon relative rotation of the rings and a friction brake intermediate said rings having gripping and releasing actions with respect to either of said rings whereby the relative rotary movement of the rings may be controlled.

4. A chuck comprising a chuck body and means for securing it to a spindle, chuck jaws mounted in the chuck body, a pair of concentrically arranged rings, one of said rings operatively connected with the chuck jaws and adapted to move said jaws radially upon relative rotation of the rings, an internal gear operatively arranged within the outer ring, an external gear upon the inner ring, a pinion meshing with both of said gears and having a bearing upon the chuck body, and a friction brake intermediate said concentric rings having gripping and releasing actions with respect to either of said rings whereby said rings will be relatively rotated through the intermediate gearing.

5. A spindle, a chuck body located at the end of the spindle, chuck jaws mounted in the chuck body, a scroll ring provided with a gear to operate the chuck jaws, an opening ring provided with a gear arranged within the scroll ring, pinions meshing with the gears on the scroll and opening rings and shiftable means located within the scroll ring for preventing rotation of said rings under the control of the operator.

6. A spindle, a chuck body located at the end of the spindle, chuck jaws mounted on the chuck body, a ring mounted on the chuck body, connections between the ring and the jaws adapted to move the jaws radially by the rotation of the ring, an opening ring mounted on the chuck body, and a friction ring located between said rings having gripping and releasing actions with respect to either of said rings, whereby the relative rotary movement of the rings may be controlled.

7. A spindle, a chuck body located on the spindle, chuck jaws mounted on the body, a scroll ring mounted in the chuck body, an opening ring mounted in the chuck body, pinions meshing with gears on the opening and scroll rings, a friction ring located between the opening and scroll rings, and means for operating the friction ring.

8. A spindle, a chuck located on the body and including a body part, chuck jaws mounted on the body part, a scroll ring to operate the chuck jaws, an opening ring mounted on the chuck body, pinions meshing with gears on the opening and scroll rings, a friction ring mounted between the opening and scroll rings, means for holding the friction ring against rotation, and means for operating the friction ring.

9. In a chuck, in combination, a body part, a scroll ring located within the body part and coöperating therewith to form a chuck casing, jaws located in the body part, and connections intermediate the jaws and scroll ring for operating the former, an opening ring mounted on the body part and within the scroll ring, connections intermediate the scroll ring and opening ring for varying the relative rotation of said parts, and a friction device arranged intermediate the scroll ring and opening ring and adapted to retard the movement of either of said parts.

10. In a chuck, in combination, a body part, jaws mounted in said body part, a scroll ring coöperating with said body part to form a chuck casing, an opening ring arranged within the scroll ring, gearing intermediate said scroll ring and opening ring, and frictional means for varying the action of said gearing whereby the relative rotation of the scroll ring and opening ring may be varied with the chuck in motion.

11. In combination in a chuck, a chuck body and means for securing said body to a spindle, chuck jaws carried in the chuck body and movable with respect thereto, a rotary ring connected with said chuck jaws, a relatively rotatable ring concentrically arranged with reference thereto and operatively connected therewith, a friction brake arranged for expansive and contractile movements with reference to said rotary rings, and by said movements, controlling the relative movements thereof, whereby the chuck jaws are moved, and an operating handle and connections for opening and closing the friction brake ring.

HARRY P. TOWNSEND.

Witnesses:
ARTHUR B. JENKINS,
LEONA O. SMITH.